US010097336B2

(12) United States Patent
Tavildar et al.

(10) Patent No.: US 10,097,336 B2
(45) Date of Patent: Oct. 9, 2018

(54) UPLINK (UL) FREQUENCY-DIVISION DUPLEX (FDD) SUBFRAME

(71) Applicant: QUALCOMM Incorporated, San Diego, CA (US)

(72) Inventors: Saurabha Tavildar, Jersey City, NJ (US); Joseph Binamira Soriaga, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 218 days.

(21) Appl. No.: 15/136,767

(22) Filed: Apr. 22, 2016

(65) Prior Publication Data

US 2017/0155494 A1    Jun. 1, 2017

Related U.S. Application Data

(60) Provisional application No. 62/261,030, filed on Nov. 30, 2015.

(51) Int. Cl.
*H04L 5/14*    (2006.01)
*H04L 5/00*    (2006.01)
(Continued)

(52) U.S. Cl.
CPC .............. *H04L 5/14* (2013.01); *H04L 1/0026* (2013.01); *H04L 1/0027* (2013.01);
(Continued)

(58) Field of Classification Search
CPC .............................. H04W 72/04; H04W 72/12
See application file for complete search history.

(56) References Cited

U.S. PATENT DOCUMENTS

2009/0073955 A1    3/2009  Malladi
2009/0110038 A1*   4/2009  Montojo ................. H04L 1/003
                                                            375/211
(Continued)

FOREIGN PATENT DOCUMENTS

WO    WO-2014155198 A2    10/2014

OTHER PUBLICATIONS

International Search Report and Written Opinion—PCT/US2016/055370—ISA/EPO—dated Jan. 5, 2017.
(Continued)

*Primary Examiner* — Xavier Szewai Wong
(74) *Attorney, Agent, or Firm* — Qualcomm IP Dept.; James Hunt Yancey, Jr.

(57) ABSTRACT

Various aspects provide a subframe for uplink (UL) communication in a frequency-division duplex (FDD) configuration. Control information in the frequency range of the UL communication may include channel quality indicator (CQI) and acknowledgement (ACK) information. The CQI information may be provided prior to a demodulation reference signal (DMRS). The ACK information may be provided subsequent to another DMRS. The CQI information may be time-division multiplexed in a common frequency range as the ACK information. A sounding reference signal (SRS) may be provided as an initial symbol of the subframe. Some CQI information may be provided in two or more separate portions that are each prior to a separate DMRS. Some ACK information may be provided in two or more separate portions that are each subsequent to another separate DMRS.

36 Claims, 11 Drawing Sheets

(51) Int. Cl.
  *H04W 72/04* (2009.01)
  *H04W 72/12* (2009.01)
  *H04L 1/00* (2006.01)
  *H04L 1/18* (2006.01)

(52) U.S. Cl.
  CPC .......... *H04L 1/1861* (2013.01); *H04L 5/0048* (2013.01); *H04L 5/0051* (2013.01); *H04L 5/0055* (2013.01); *H04L 5/0057* (2013.01); *H04W 72/0413* (2013.01); *H04W 72/0446* (2013.01); *H04W 72/12* (2013.01)

(56) References Cited

U.S. PATENT DOCUMENTS

| | | | |
|---|---|---|---|
| 2010/0135273 | A1 | 6/2010 | Kim et al. |
| 2011/0085516 | A1 | 4/2011 | Pajukoski et al. |
| 2013/0273923 | A1* | 10/2013 | Li .................. H04W 28/02 455/450 |
| 2014/0079017 | A1 | 3/2014 | Womack et al. |
| 2014/0286255 | A1 | 9/2014 | Nam et al. |
| 2015/0181589 | A1 | 6/2015 | Luo et al. |
| 2015/0358124 | A1* | 12/2015 | Suzuki ............... H04L 1/1861 370/329 |
| 2017/0070277 | A1* | 3/2017 | Si .................. H04B 7/0413 |

OTHER PUBLICATIONS

Motorola: "UL Sounding RS for E-UTRA," R1-073757, 3GPP TSG RAN WG1 #50, Athens, Greece, Aug. 20-24, 2007, pp. 1-8.
Samsung: "Summary of Reflector Discussions on EUTRA DL RS," R1-073569, 3GPP TSG RAN WG1 Meeting #50, Athens, Greece, Aug. 20-24, 2007, pp. 1-3.

* cited by examiner

UPLINK (UL) FREQUENCY-DIVISION DUPLEX (FDD) SUBFRAME

CROSS-REFERENCE TO RELATED APPLICATION

This application claims priority to and benefit of provisional patent application No. 62/261,030 filed in the United States Patent and Trademark Office on Nov. 30, 2015, the entire content of which is hereby incorporated herein by reference.

TECHNICAL FIELD

Aspects of the present disclosure relate, generally, to wireless communication systems and, more particularly, to an uplink (UL) frequency-division duplex (FDD) subframe. By utilizing aspects discussed below communication systems include features enabling and providing low latency transmissions and capable of use with multiple waveform types (such as orthogonal frequency-division multiplexing (OFDM) and single-carrier frequency-division multiplexing (SC-FDM), among others).

INTRODUCTION

Wireless communication networks are widely deployed to provide various communication services such as telephony, video, data, messaging, broadcasts, and so on. Such networks, which are usually multiple access networks, support communications for multiple users by sharing the available network resources. Within wireless networks a variety of data services may be provided, including voice, video, and emails.

The spectrum allocated to wireless communication networks can include licensed spectrum and/or unlicensed spectrum. Licensed spectrum is generally restricted in its use as regulated by a governmental body or other authority within a given region. Unlicensed spectrum is generally free to use, within limits, without the purchase or use of a license.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Embodiments of the present invention are generally directed to techniques for communicating between components of wireless networks. Communication can occur between traditionally defined network side components and user side components. Communications may also occur between user-perspective devices. To facilitate communications, devices usually transmit information (sometimes referred to as an uplink communication) to aid in setting up communications. Information can be control information (pertaining to network operation) as well as data or payload (pertaining to the actual information users desire to communicate). Embodiments discussed in this disclosure generally relate to uplink communications including waveform, structure design, and control information.

In one aspect, the present disclosure provides an apparatus for wireless communication. The apparatus includes a transceiver, a memory, and at least one processor communicatively coupled to the transceiver and the memory. The at least one processor may be configured to utilize the transceiver to transmit and/or receive control information in a frequency range of an UL communication, wherein the control information may include channel quality indicator (CQI) information and acknowledgement (ACK) information. The CQI information may be transmitted and/or received prior to a first demodulation reference signal (DMRS). The ACK information may be transmitted and/or received subsequent to a second DMRS. The second DMRS may subsequent to the first DMRS.

In another aspect, the present disclosure provides a method for wireless communication. The method may include transmitting and/or receiving control information in a frequency range of an UL communication, wherein the control information includes CQI information and ACK information. The CQI information may be transmitted and/or received prior to a first DMRS. The ACK information may be transmitted and/or received subsequent to a second DMRS. The second DMRS may subsequent to the first DMRS.

In yet another aspect, the present disclosure provides a computer-readable medium storing computer-executable code. The computer-executable code may include instructions configured to transmit and/or receive control information in a frequency range of an UL communication, wherein the control information includes CQI information and ACK information. The CQI information may be transmitted and/or received prior to a first DMRS. The ACK information may be transmitted and/or received subsequent to a second DMRS. The second DMRS may subsequent to the first DMRS.

In a further aspect of the present disclosure, the present disclosure provides an apparatus for wireless communication. The apparatus may include means for transmitting and/or means for receiving control information in a frequency range of an UL communication, wherein the control information includes CQI information and ACK information. The CQI information may be transmitted and/or received prior to a first DMRS. The ACK information may be transmitted and/or received subsequent to a second DMRS. The second DMRS may subsequent to the first DMRS.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, certain structures and components are shown in block diagram form in order to avoid obscuring such concepts.

The concepts presented throughout this disclosure may be implemented across a broad variety of telecommunication systems, network architectures, and communication standards. The 3rd Generation Partnership Project (3GPP) is a standards body that defines several wireless communication standards for networks involving an evolved packet system (EPS), which may sometimes be referred to as long-term evolution (LTE) network. In an LTE network, packets may utilize the same or similar latency targets. As such, an LTE network may provide a one-size-fits-all latency configuration. Evolved versions of an LTE network, such as a fifth-generation (5G) network, may provide many different types of services and/or applications (e.g., web browsing, video streaming, VoIP, mission critical applications, multi-hop networks, remote operations with real-time feedback, tele-surgery, and others).

Figure 1:
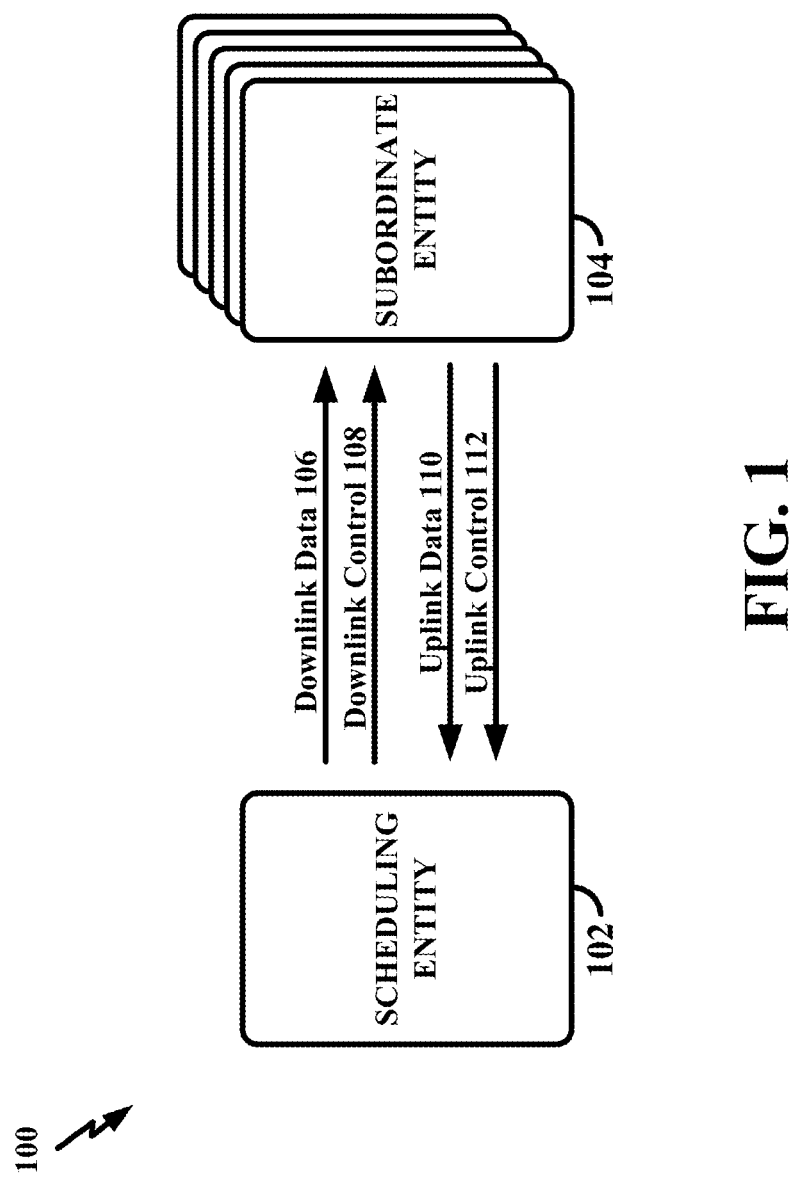
FIG. 1 is a diagram illustrating an example of various communications between a scheduling entity and one or more subordinate entities according to aspects of the present disclosure.

FIG. 1 is a diagram 100 illustrating an example of various communications between multiple wireless devices, including a scheduling entity 102 and one or more subordinate entities 104 according to aspects of the present disclosure. The terms 'scheduling entity' and/or 'subordinate entity' are names given to describe certain characterizations, functions, descriptions, and/or characteristics of certain devices. The structure of these devices may be similar or different relative to each other without necessarily deviating from the scope of the present disclosure. Broadly, the scheduling entity 102 is a node or device responsible for scheduling traffic in a wireless communication network, including various downlink (DL) and uplink (UL) transmissions. The scheduling entity 102 may sometimes be referred to as a scheduler, and/or any other suitable term without deviating from the scope of the present disclosure. The scheduling entity 102 may be, or may reside within, a base station, a base transceiver station, a radio base station, a radio transceiver, a transceiver function, a basic service set, an extended service set, an access point, a Node B, a user equipment (UE) (examples provided below), a mesh node, a relay, a peer, and/or any other suitable device. Each of the illustrated scheduling entities 102 can communicate with one or more of the illustrated subordinate entities 104 (and vice versa).

Broadly, the subordinate entity 104 is a node or device that receives scheduling and/or control information, including but not limited to scheduling grants, synchronization or timing information, or other control information from another entity in the wireless communication network, such as the scheduling entity 102. The subordinate entity 104 may be referred to as a schedulee, and/or any other suitable term without deviating from the scope of the present disclosure. The subordinate entity 104 may be, or may reside within, a UE, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable computing device (e.g., a smart watch, glasses, a health or fitness tracker, etc.), an appliance, a sensor, a vending machine, and/or any other suitable device.

The scheduling entity 102 may transmit DL data channel(s) 106 and DL control channel(s) 108. As used herein, 'control channel(s)' may sometimes be used to communicate grant information. The subordinate entity 104 may transmit UL data channel(s) 110 and UL control channel(s) 112. The channels illustrated in FIG. 1 are not necessarily all of the channels that may be utilized by the scheduling entity 102 and/or the subordinate entity 104. Those of ordinary skill in the art will recognize that other channels may be utilized in addition to those illustrated, such as other data, control, and feedback channels. As used herein, the term 'downlink' or 'DL' may refer to a point-to-multipoint transmission originating at the scheduling entity 102, and the term 'uplink' or 'UL' may refer to a point-to-point transmission originating at the subordinate entity 104. According to aspects of the present disclosure, the term(s) 'communicate' and/or 'communicating' refer to transmission and/or reception. One of ordinary skill in the art will understand that many types of technologies may perform such communication without deviating from the scope of the present disclosure. As used herein, the term 'DL-centric time-division duplex (TDD) subframe' refers to a TDD subframe in which a substantial proportion (e.g., majority) of the information is communicated in the DL direction, even though some of the information may be communicated in the UL direction. Also, the term 'UL-centric TDD subframe' refers to a TDD subframe in which a substantial proportion (e.g., majority) of the information is communicated in the UL direction, even though some information may be communicated in the DL direction.

Figure 2:
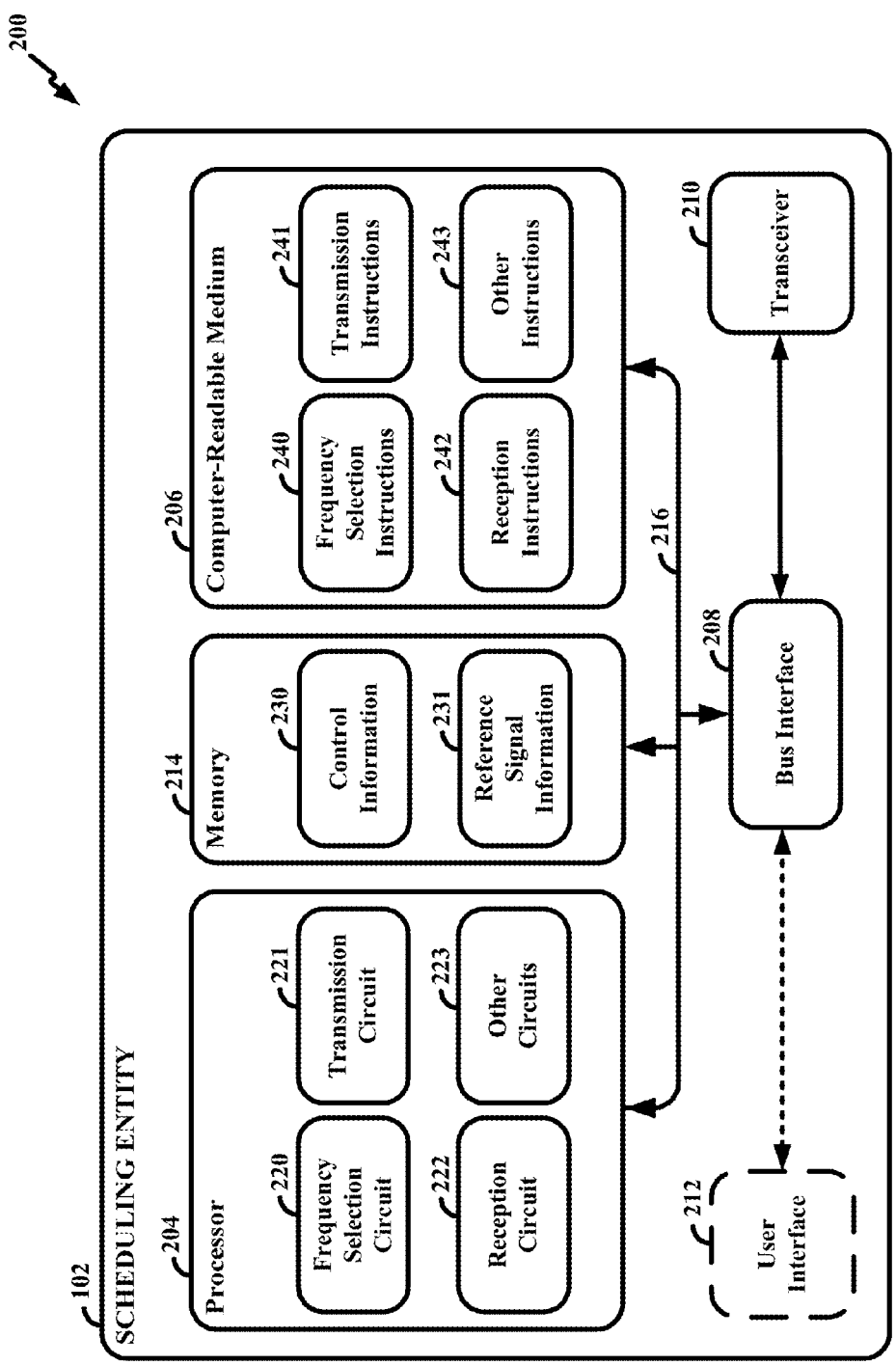
FIG. 2 is a diagram illustrating an example of an implementation of a scheduling entity according to aspects of the present disclosure.

FIG. 2 is a diagram 200 illustrating an example of an implementation of the scheduling entity 102 according to various aspects of the present disclosure. The scheduling entity 102 may include a user interface 212. The user interface 212 may be configured to receive one or more inputs from a user of the scheduling entity 102. In some configurations, the user interface 212 may be a keypad, a display, a speaker, a microphone, a joystick, and/or any other suitable component of the scheduling entity 102. The user interface 212 may exchange data via the bus interface 208. The scheduling entity 102 may also include a transceiver 210. The transceiver 210 may be configured to receive data and/or transmit data in communication with another apparatus. The transceiver 210 provides a means for communicating with another apparatus via a wired or wireless transmission medium. The transceiver 210 may be configured to perform such communications using various types of technologies without deviating from the scope of the present disclosure.

The scheduling entity 102 may also include a memory 214, one or more processors 204, a computer-readable medium 206, and a bus interface 208. The bus interface 208 may provide an interface between a bus 216 and the transceiver 210. The memory 214, the one or more processors 204, the computer-readable medium 206, and the bus interface 208 may be connected together via the bus 216. The processor 204 may be communicatively coupled to the transceiver 210 and/or the memory 214.

The processor 204 may also include a frequency selection circuit 220. The frequency selection circuit 220 may include various hardware components and/or may perform various algorithms that provide the means for selecting a frequency range for UL communication. A selected frequency range for UL communication is different from a frequency range of DL communication. The processor 204 may include a transmission circuit 221. The transmission circuit 221 may include various hardware components and/or may perform various algorithms that provide the means for transmitting control information in the frequency range of the UL communication. The control information may include CQI information and ACK information. The CQI information may be transmitted prior to a first demodulation reference signal (DMRS). The ACK information may be transmitted subsequent to a second DMRS. In some configurations, the transmission circuit 221 may include various hardware components and/or may perform various algorithms that provide the means for transmitting a header to a Physical Uplink Shared Channel (PUSCH). A header can include additional control information that includes additional CQI information. In some configurations, the transmission circuit 221 may include various hardware components and/or may perform various algorithms that provide the means for transmitting a sounding reference signal (SRS) as an initial symbol of a subframe of the UL communication.

The processor 204 may also include a reception circuit 222. The reception circuit 222 may include various hardware components and/or may perform various algorithms that provide the means for receiving scheduling information configured to dedicate one or more resources in the control channel for the CQI information. The foregoing description provides a non-limiting example of the processor 204 of the scheduling entity 102. Although various circuits 220, 221, 222 are described above, one of ordinary skill in the art will understand that the processor 204 may also include various other circuits 223 that are in addition and/or alternative(s) to the aforementioned circuits 220, 221, 222. Such other circuits 223 may provide the means for performing any one or more of the functions, methods, processes, features and/or aspects described herein.

The computer-readable medium 206 may include various computer-executable instructions. The computer-executable instructions may include computer-executable code configured to perform various functions and/or enable various aspects described herein. The computer-executable instructions may be executed by various hardware components (e.g., the processor 204 and/or any of its circuits 220, 221, 222, 223) of the scheduling entity 102. The computer-executable instructions may be a part of various software programs and/or software modules. The computer-readable medium 206 may include frequency selection instructions 240. The frequency selection instructions 240 may include computer-executable instructions configured for selecting a frequency range for UL communication. The selected frequency range for UL communication is different from a frequency range of DL communication. The computer-readable medium 206 may also include transmission instructions 241. The transmission instructions 241 may be configured for transmitting control information in the frequency range of the UL communication. The control information may include CQI information and ACK information. The CQI information may be transmitted prior to a first DMRS. The ACK information may be transmitted subsequent to a second DMRS. In some configurations, the transmission instructions 241 may be configured for transmitting a header to a PUSCH. The header includes additional control information that includes additional CQI information. In some configurations, the transmission instructions 241 may be configured for transmitting an SRS as an initial symbol of a subframe of the UL communication.

The computer-readable medium 206 may also include reception instructions 242. The reception instructions 242 may include computer-executable instructions configured for receiving scheduling information configured to dedicate one or more resources in the control channel for the CQI information. The foregoing description provides a non-limiting example of the computer-readable medium 206 of the scheduling entity 102. Although various computer-executable instructions 240, 241, 242 are described above, one of ordinary skill in the art will understand that the computer-readable medium 206 may also include various other computer-executable instructions 243 that are in addition and/or alternative(s) to the aforementioned computer-executable instructions 240, 241, 242. Such other computer-executable instructions 243 may be configured for any one or more of the functions, methods, processes, features and/or aspects described herein.

The memory 214 may include various memory modules. The memory modules may be configured to store, and have read therefrom, various values and/or information by the processor 204, or any of its circuits 220, 221, 222, 223. The memory modules may also be configured to store, and have read therefrom, various values and/or information upon execution of the computer-executable code included in the computer-readable medium 206, or any of its instructions 240, 241, 242, 243. The memory 214 may include control information 230. The control information 230 may include various types, quantities, configurations, arrangements, and/or forms of CQI information, ACK information, and other suitable forms of information without deviating from the scope of the present disclosure. The memory may also include reference signal information 231. The reference signal information 231 may include various types, quantities, configurations, arrangements, and/or forms of DMRSs, UE-specific reference signals (UERSs), and other suitable information corresponding to reference signals without deviating from the scope of the present disclosure. The foregoing description provides a non-limiting example of the memory 214 of the scheduling entity 102. Although various types of data of the memory 214 are described above, one of ordinary skill in the art will understand that the memory 214 may also include various other data that are in addition and/or alternative(s) to the aforementioned data 230, 231. Such other data may be associated with any one or more of the functions, methods, processes, features and/or aspects described herein.

One of ordinary skill in the art will also understand that the scheduling entity 102 may include alternative and/or additional features without deviating from the scope of the present disclosure. In accordance with various aspects of the present disclosure, an element, or any portion of an element, or any combination of elements may be implemented with a processing system that includes one or more processors 204. Examples of the one or more processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 216 and bus interface 208. The bus 216 may include any number of interconnecting buses and bridges depending on the specific application of the processing system and the overall design constraints. The bus 216 may link together various circuits including the one or more processors 204, the memory 214, and the computer-readable medium 206. The bus 216 may also link various other circuits such as timing sources, peripherals, voltage regulators, and power management circuits.

The one or more processors 204 may be responsible for managing the bus 216 and general processing, including the execution of software stored on the computer-readable medium 206. The software, when executed by the one or more processors 204, causes the processing system to perform the various functions described below for any one or more apparatuses. The computer-readable medium 206 may also be used for storing data that is manipulated by the one or more processors 204 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 206.

The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may also include, by way of example, a carrier wave, a transmission line, and any other suitable medium for transmitting software and/or instructions that may be accessed and read by a computer. The computer-readable medium 206 may reside in the processing system, external to the processing system, or distributed across multiple entities including the processing system. The computer-readable medium 206 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 3:
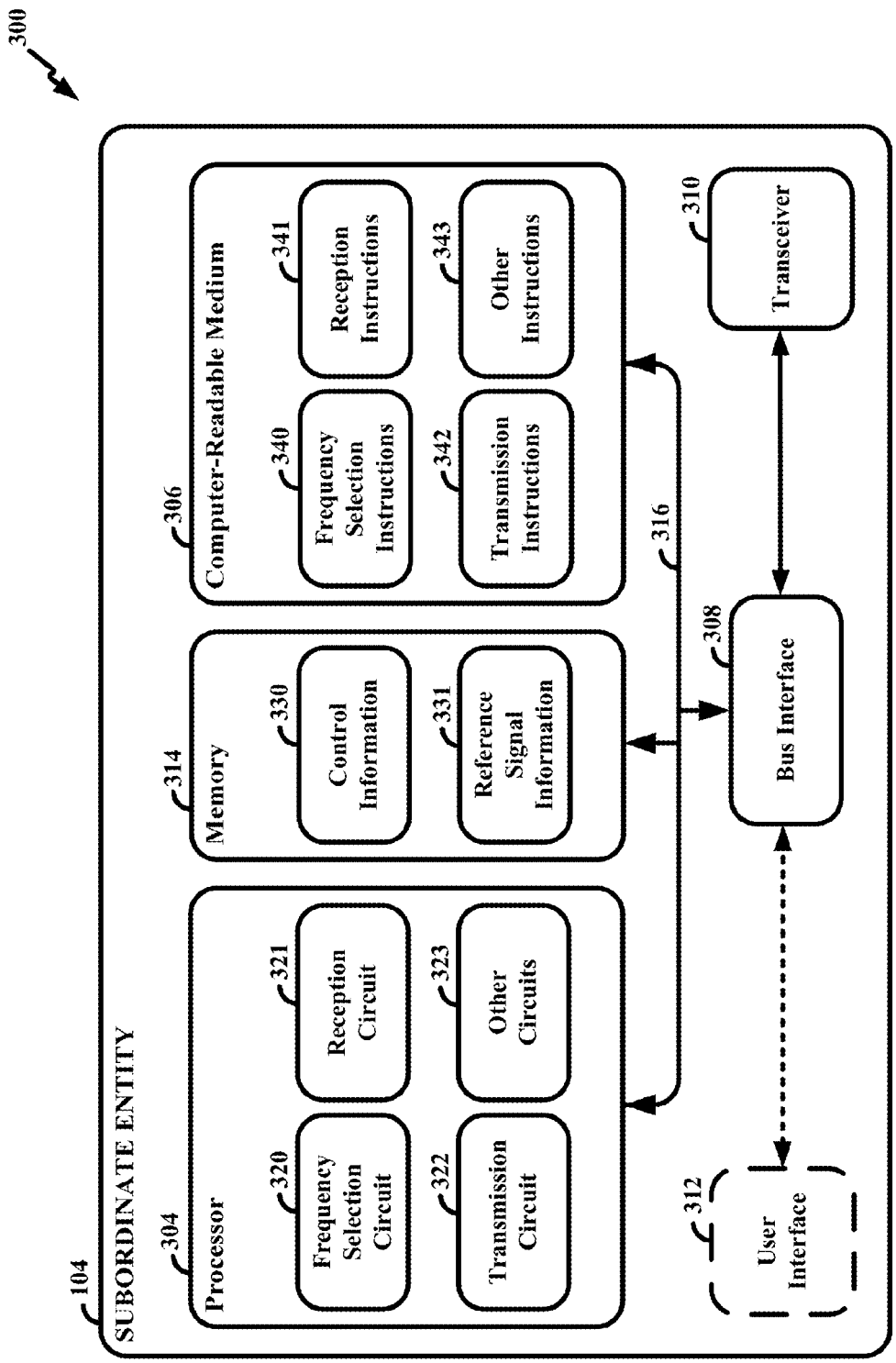
FIG. 3 is a diagram illustrating an example of an implementation of the subordinate entity according to aspects of the present disclosure.

FIG. 3 is a diagram 300 illustrating an example of an implementation of the subordinate entity 104 according to various aspects of the present disclosure. The subordinate entity 104 may include a user interface 312. The user interface 312 may be configured to receive one or more inputs from a user of the subordinate entity 104. In some configurations, the user interface 312 may be a keypad, a display, a speaker, a microphone, a joystick, and/or any other suitable component of the subordinate entity 104. The user interface 312 may exchange data via the bus interface 308. The subordinate entity 104 may also include a transceiver 310. The transceiver 310 may be configured to receive data and/or transmit data in communication with another apparatus. The transceiver 310 provides a means for communicating with another apparatus via a wired or wireless transmission medium. The transceiver 310 may be configured to perform such communications using various types of technologies without deviating from the scope of the present disclosure.

The subordinate entity 104 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The processor 304 may also include a frequency selection circuit 320. The frequency selection circuit 320 may include various hardware components and/or may perform various algorithms that provide the means for selecting a frequency range for UL communication. The selected frequency range for UL communication is different from a frequency range of DL communication.

The processor 304 may include a reception circuit 321. The reception circuit 321 may include various hardware components and/or may perform various algorithms that provide the means for receiving control information in the frequency range of the UL communication. The control information may include CQI information and ACK information. The CQI information may be received prior to a first DMRS. The ACK information may be received subsequent to a second DMRS. In some configurations, the reception circuit 321 may include various hardware components and/or may perform various algorithms that provide the means for receiving a header to a PUSCH. The header includes additional control information that includes additional CQI information. In some configurations, the reception circuit 321 may include various hardware components and/or may perform various algorithms that provide the means for receiving an SRS as an initial symbol of a subframe of the UL communication.

The processor 304 may also include a transmission circuit 322. The transmission circuit 322 may include various hardware components and/or may perform various algorithms that provide the means for transmitting scheduling information configured to dedicate one or more resources in the control channel for the CQI information. The foregoing description provides a non-limiting example of the processor 304 of the subordinate entity 104. Although various circuits 320, 321, 322 are described above, one of ordinary skill in the art will understand that the processor 304 may also include various other circuits 323 that are in addition and/or alternative(s) to the aforementioned circuits 320, 321, 322. Such other circuits 323 may provide the means for performing any one or more of the functions, methods, processes, features and/or aspects described herein.

The computer-readable medium 306 may include various computer-executable instructions. The computer-executable instructions may include computer-executable code configured to perform various functions and/or enable various aspects described herein. The computer-executable instructions may be executed by various hardware components (e.g., the processor 304 and/or any of its circuits 320, 321, 322, 323) of the subordinate entity 104. The computer-executable instructions may be a part of various software programs and/or software modules. The computer-readable medium 306 may include frequency selection instructions 340. The frequency selection instructions 340 may include computer-executable instructions configured for selecting a frequency range for UL communication. The selected frequency range for UL communication is different from a frequency range of DL communication. The computer-readable medium 306 may also include reception instructions 341. The reception instructions 341 may be configured for receiving control information in the frequency range of the UL communication. The control information may include CQI information and ACK information. The CQI information may be received prior to a first DMRS. The ACK information may be received subsequent to a second DMRS. In some configurations, the reception instructions 341 may be configured for receiving a header to a PUSCH. The header includes additional control information that includes additional CQI information. In some configurations, the reception instructions 341 may be configured for receiving an SRS as an initial symbol of a subframe of the UL communication.

The computer-readable medium 306 may also include transmission instructions 342. The transmission instructions 342 may include computer-executable instructions configured for transmitting scheduling information configured to dedicate one or more resources in the control channel for the CQI information. The foregoing description provides a non-limiting example of the computer-readable medium 306 of the subordinate entity 104. Although various computer-executable instructions 340, 341, 342 are described above, one of ordinary skill in the art will understand that the computer-readable medium 306 may also include various other computer-executable instructions 343 that are in addition and/or alternative(s) to the aforementioned computer-executable instructions 340, 341, 342. Such other computer-executable instructions 343 may be configured for any one or more of the functions, methods, processes, features and/or aspects described herein.

The memory 314 may include various memory modules. The memory modules may be configured to store, and have read therefrom, various values and/or information by the processor 304, or any of its circuits 320, 321, 322, 323. The memory modules may also be configured to store, and have read therefrom, various values and/or information upon execution of the computer-executable code included in the computer-readable medium 306, or any of its instructions 340, 341, 342, 343. The memory 314 may include control information 330. The control information 330 may include various types, quantities, configurations, arrangements, and/or forms of CQI information, ACK information, and other suitable forms of information without deviating from the scope of the present disclosure. The memory may also include reference signal information 331. The reference signal information 331 may include various types, quantities, configurations, arrangements, and/or forms of DMRSs, UERSs, and other suitable information corresponding to reference signals without deviating from the scope of the present disclosure. The foregoing description provides a non-limiting example of the memory 314 of the subordinate entity 104. Although various types of data of the memory 314 are described above, one of ordinary skill in the art will understand that the memory 314 may also include various other data that are in addition and/or alternative(s) to the aforementioned data 330, 331. Such other data may be associated with any one or more of the functions, methods, processes, features and/or aspects described herein.

One of ordinary skill in the art will also understand that the subordinate entity 104 may include alternative and/or additional features without deviating from the scope of the present disclosure. In accordance with various aspects of the present disclosure, an element, or any portion of an element, or any combination of elements may be implemented with a processing system that includes one or more processors 304. Examples of the one or more processors 304 include microprocessors, microcontrollers, DSPs, FPGAs, PLDs, state machines, gated logic, discrete hardware circuits, and other suitable hardware configured to perform the various functionality described throughout this disclosure. The processing system may be implemented with a bus architecture, represented generally by the bus 316 and bus interface 308. The bus 316 may include any number of interconnecting buses and bridges depending on the specific application of the processing system and the overall design constraints. The bus 316 may link together various circuits including the one or more processors 304, the memory 314, and the computer-readable medium 306. The bus 316 may also link various other circuits such as timing sources, peripherals, voltage regulators, and power management circuits.

The one or more processors 304 may be responsible for managing the bus 316 and general processing, including the execution of software stored on the computer-readable medium 306. The software, when executed by the one or more processors 304, causes the processing system to perform the various functions described below for any one or more apparatuses. The computer-readable medium 306 may also be used for storing data that is manipulated by the one or more processors 304 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 306 may also include, by way of example, a carrier wave, a transmission line, and any other suitable medium for transmitting software and/or instructions that may be accessed and read by a computer. The computer-readable medium 306 may reside in the processing system, external to the processing system, or distributed across multiple entities including the processing system. The computer-readable medium 306 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 4:
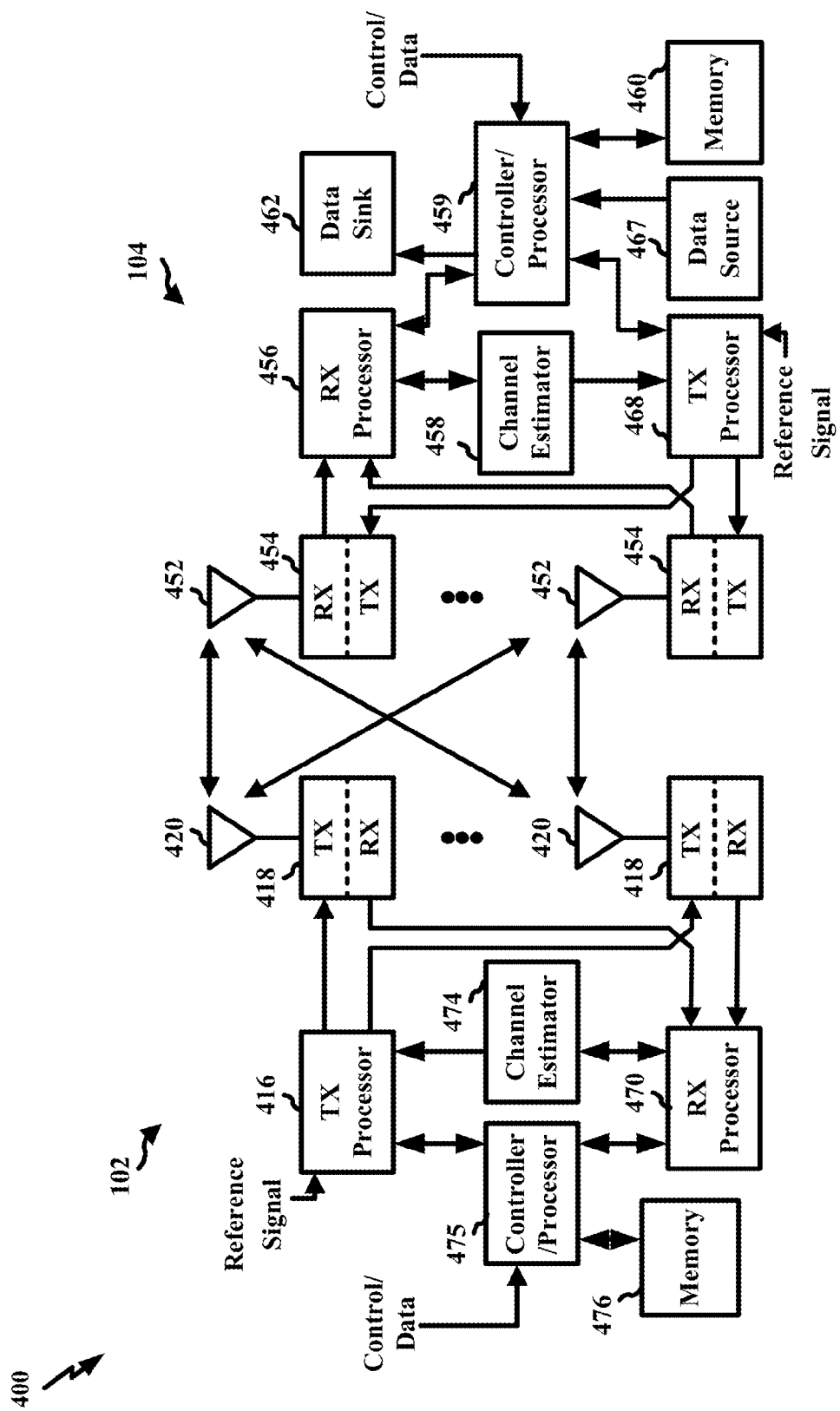
FIG. 4 is a diagram illustrating an example of a scheduling entity in communication with a subordinate entity in an access network according to aspects of the present disclosure.

FIG. 4 is a diagram 400 of the scheduling entity 102 in communication with the subordinate entity 104 in an access network according to aspects of the present disclosure. In a DL scenario, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the subordinate entity 104 based on various priority metrics. The controller/processor 475 is also responsible for HARQ operations, retransmission of lost packets, and signaling to the subordinate entity 104.

The transmit (TX) processor 416 implements various signal processing functions for the L1 layer (i.e., physical layer). The signal processing functions include coding and interleaving to facilitate forward error correction (FEC) at the subordinate entity 104 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the subordinate entity 104. Each spatial stream may then be provided to a different antenna 420 via a separate transmitter 418TX. Each transmitter 418TX may modulate an RF carrier with a respective spatial stream for transmission.

Each receiver 418RX may be configured to receive wireless signals of various types, schemes, configurations, and/or modulations. The RX processor 470 may be configured to receive, decode, demodulate, and/or otherwise process any UL signal that is received by the receiver 418RX. In some examples, the UL signal is adapted for orthogonal frequency-division multiple access (OFDMA), which is a multi-user version of the modulation scheme referred to as orthogonal frequency-division multiplexing (OFDM). In some examples, the UL signal is adapted for single-carrier frequency-division multiple access (SC-FDMA). Such signals may even co-exist in some examples. In other words, the RX processor 470 and the receiver 418RX may perform UL communication using waveforms that may co-exist in OFDMA and SC-FDMA.

At the subordinate entity 104, each receiver 454RX receives a signal through its respective antenna 452. Each receiver 454RX recovers information modulated onto an RF carrier and provides the information to a receive (RX) processor 456. The RX processor 456 implements various signal processing functions of the L1 layer. The RX processor 456 may perform spatial processing on the information to recover any spatial streams destined for the subordinate entity 104. If multiple spatial streams are destined for the subordinate entity 104, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the scheduling entity 102. These soft decisions may be based on channel estimates computed by the channel estimator 458. The soft decisions are then decoded and deinterleaved to recover the data and control signals that were originally transmitted by the scheduling entity 102 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an ACK and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the scheduling entity 102, the controller/processor 459 implements the L2 layer for the user plane and the control plane by providing header compression, ciphering, packet segmentation and reordering, and multiplexing between logical and transport channels based on radio resource allocations by the scheduling entity 102. The controller/processor 459 is also responsible for HARQ operations, retransmission of lost packets, and signaling to the scheduling entity 102.

Channel estimates derived by a channel estimator 458 from a reference signal or feedback transmitted by the scheduling entity 102 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

Each transmitter 454TX may be configured to transmit wireless signals of various types, schemes, configurations, and/or modulations. The TX processor 468 may be configured to generate, encode, modulate, and/or otherwise produce any UL signal that is transmitted by the transmitter 454TX. In some examples, the UL signal is adapted for OFDMA. In some examples, the UL signal is adapted for SC-FDMA. Such signals may even co-exist in some examples. In other words, the TX processor 468 and the transmitter 454TX may perform UL communication using waveforms that co-exist in OFDMA and SC-FDMA.

The UL transmission is processed at the scheduling entity 102 in a manner similar to that described in connection with the receiver function at the subordinate entity 104. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides de-multiplexing between transport and logical channels, packet reassembly, deciphering, header decompression, control signal processing to recover upper layer packets from the subordinate entity 104. Upper layer packets from the controller/processor 475 may be provided to the core network. The controller/processor 475 is also responsible for error detection using an ACK and/or NACK protocol to support HARQ operations.

Figure 5:
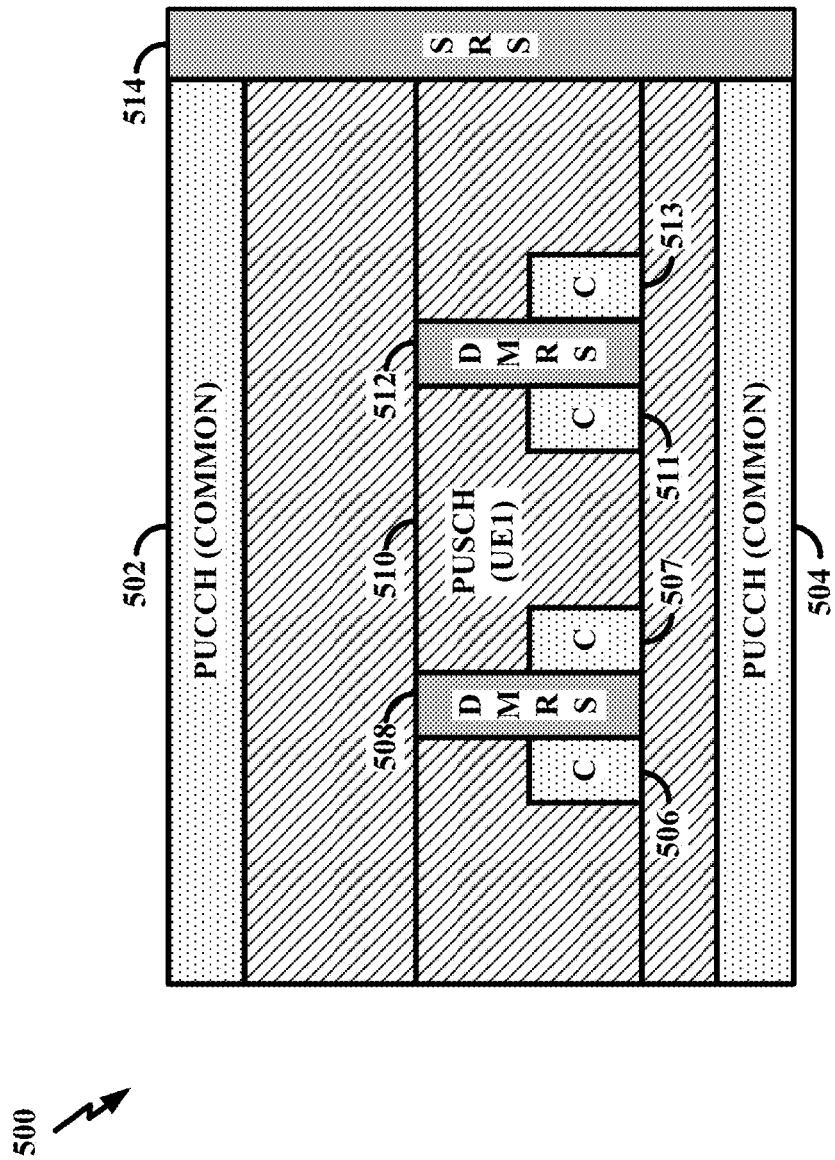
FIG. 5 is a diagram illustrating an uplink (UL) frequency-duplex division (FDD) subframe structure according to aspects of some configurations.

FIG. 5 is a diagram 500 illustrating an UL frequency-duplex division (FDD) subframe structure. In some scenarios, the structure may be implemented in LTE. In the example illustrated in FIG. 5, the UL FDD subframe includes a common Physical Uplink Control Channel (PUCCH) 502, 504. The PUCCH that spans nearly the entire duration of the UL FDD subframe. Generally, a PUCCH carries control information in the UL direction (e.g., from a subordinate entity 104 to a scheduling entity 102). The common PUCCH 502, 504 may be a common resource that is not necessarily dedicate to a particular subordinate entity 104. The control information included in the common PUCCH 502, 504 may include ACK information as well other information, such as CQI information and/or scheduling request (SR) information. The UL FDD subframe may also include various control channels 506, 507, 511, 513, which may be near reference signals, such as DMRSs 508, 512.

Generally, a DMRS is a type of UL reference signal that may be utilized for channel estimation and/or interference estimation. The DMRS may have a known sequence and/or modulation. Accordingly, the scheduling entity 102 receiving the DMRS transmitted by the subordinate entity 104 may determine the condition of the channel and/or how other concurrent communications might be interfering with that UL FDD subframe. Information communicated near reference signals may be relatively reliable due to a better channel estimate. In the example illustrated in FIG. 5, the PUSCH 510 may be communicated near certain reference signals (e.g., DMRSs 508, 512). The PUSCH 510 may carry information from a particular subordinate entity (e.g., UE1). In some configurations, as illustrated in FIG. 5, the last symbol of the UL FDD subframe is an SRS 514. Generally, an SRS is another type of UL reference signal. In some examples, the SRS is used by the scheduling entity 102 to estimate the UL channel conditions for scheduling.

Notably, in some configurations, control information spans across nearly an entire duration of the UL FDD subframe. For example, referring to FIG. 5, the common PUCCH 502, 504 includes control information, and the common PUCCH 502, 504 spans nearly an entire duration of the UL FDD subframe. As described above, the control information included in the common PUCCH 502, 504 may include ACK information as well other information, such as CQI information and/or SR information. Because the ACK information may span nearly an entire duration of the UL FDD subframe, nearly an entire UL FDD subframe may need to be received, decoded, demodulated, and/or processed for that ACK information. Aspects that enable a relatively faster turnaround time for providing ACK information in the UL FDD subframe may enhance the overall communication and user experience.

Figure 6:
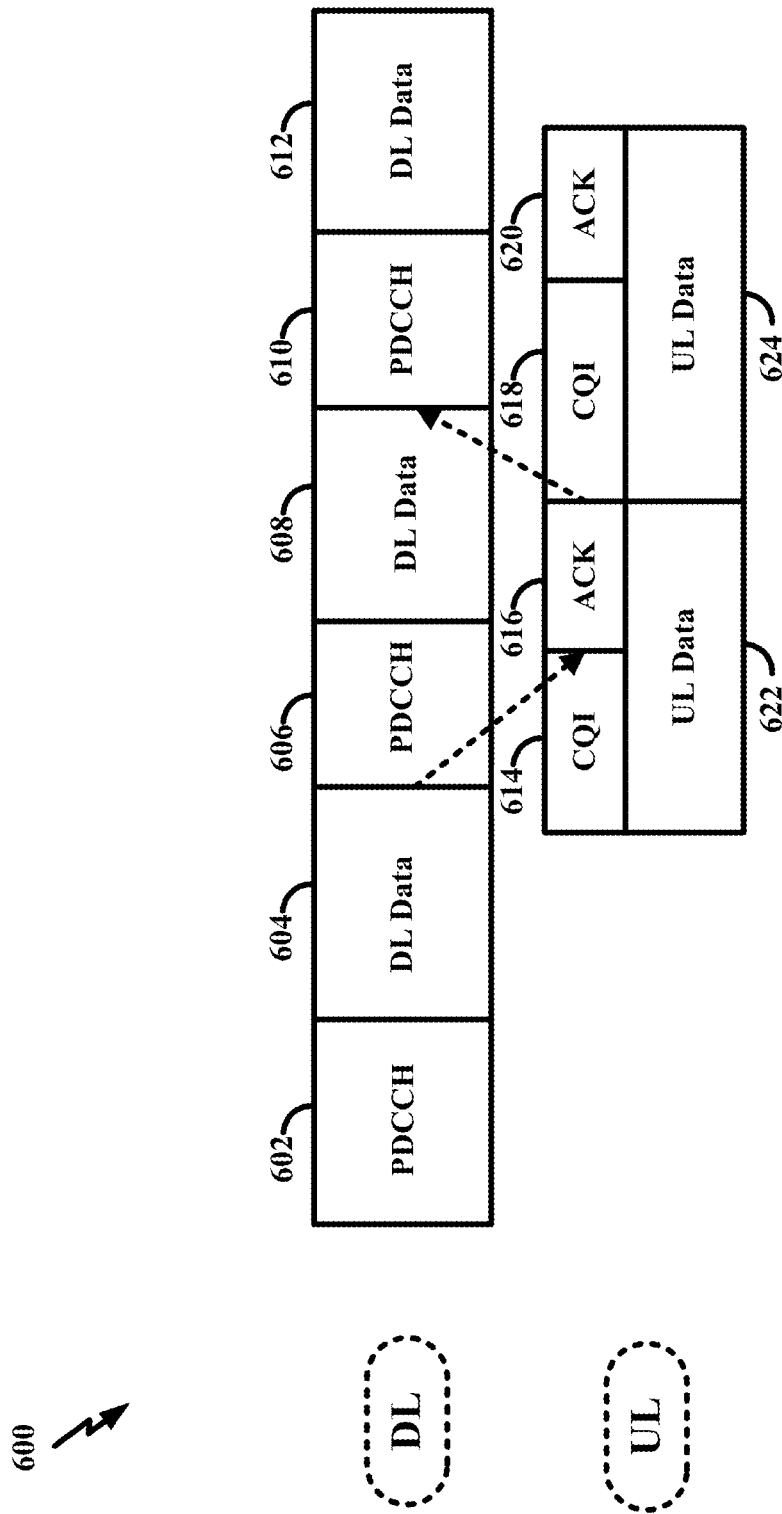
FIG. 6 is a diagram illustrating an example of various FDD subframes according to aspects of the present disclosure.

FIG. 6 is a diagram 600 illustrating an example of various FDD subframes according to aspects of the present disclosure. More specifically, FIG. 6 illustrates an example of UL FDD subframes and DL FDD subframes. One of ordinary skill in the art will understand that the examples of FDD subframes shown in FIG. 6 are provided for illustrative and discussion purposes and shall not necessarily limit the scope of the present disclosure. Alternative configurations of FDD subframes exist and are within the scope of the present disclosure. In the non-limiting examples illustrated in FIG. 6, each DL FDD subframe includes a Physical Downlink Control Channel (PDCCH) 602, 606, 610 and DL data 604, 608, 612. Also in the non-limiting examples illustrated in FIG. 6, each UL FDD subframe includes (i) CQI information 614, 618 and ACK information 616, 620 in a first frequency range of the UL FDD subframe and (ii) UL data 622, 624 in a second frequency range of the UL FDD subframe.

The ACK information 616, 620 in the UL FDD subframe may respectively correspond to DL data 604, 608 in the DL FDD subframe. For example, the ACK information 616 in an UL FDD subframe may correspond to a preceding DL data 604 in the DL FDD subframe. In other words, the ACK information 616 in the UL FDD subframe may indicate whether that DL data 604 was successfully received and decoded. If so, the ACK information 616 may include an ACK message; otherwise, the ACK information 616 may include a NACK message. If the ACK information 616 includes a NACK message, the PDCCH 610 may schedule a retransmission of the data in a DL data 612 of a subsequent DL FDD subframe. These aspects may enable a relatively fast turnaround time for providing ACK information in the UL FDD subframe. Additional information related to the aspects describe with reference to FIG. 6 is provided below.

Figure 7:
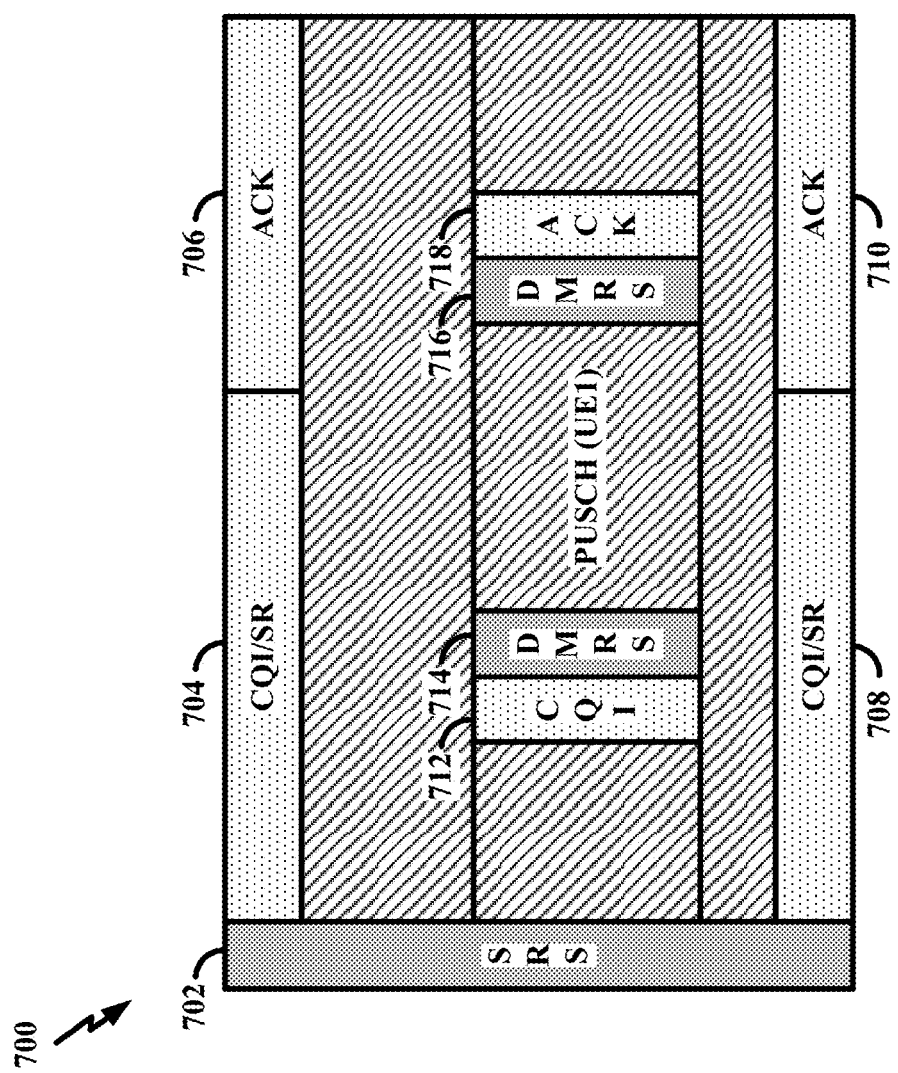
FIG. 7 is a diagram illustrating another example of an UL FDD subframe according to aspects of the present disclosure.

FIG. 7 is a diagram 700 illustrating another example of an UL FDD subframe according to aspects of the present disclosure. In some configurations, the example illustrated in FIG. 7 may be referred to as a single-carrier frequency-division multiplexing (SC-FDM) design without deviating from the scope of the present disclosure. One of ordinary skill in the art will understand that control information may be included in many forms, types, structures, and/or configurations without deviating from the scope of the present disclosure. In the example illustrated in FIG. 7, control information includes CQI/SR information 704, 708 that is time-multiplexed with ACK information 706, 710. In other words, the CQI/SR information 704, 708 utilizes a particular frequency range for a first period of time, and the ACK information 706, 710 utilizes that particular frequency range for a second period of time. In comparison, referring to FIG. 5, some configurations have control information included in common PUCCH 502, 504, and that common PUCCH 502, 504 may include ACK, CQI, and SR information and may occupy nearly an entire duration of the UL FDD subframe. However, the ACK information 706, 710 illustrated in FIG. 7 occupies less than nearly an entire duration of the UL FDD subframe. Although the ACK information 706, 710 illustrated in FIG. 7 occupies a later time portion of the UL FDD subframe, one of ordinary skill in the art will understand that that the ACK information 706, 710 may alternatively occupy any earlier time portion of the UL FDD subframe without deviating from the scope of the present disclosure.

As described above, some ACK information included in the UL FDD subframe illustrated in FIG. 7 may correspond to a preceding DL data transmission. Put another way, some ACK information included in the UL FDD subframe illustrated in FIG. 7 may indicate whether a preceding DL data transmission was successful. For example, the ACK information 718 may correspond to the transmission of DL data, which may occur in a DL FDD subframe that precedes the UL FDD subframe in which that ACK information 718 is communicated. In some circumstances, the UL TDD subframe may (at least in part) overlap with the DL FDD subframe. According to some aspects of the present disclosure, the ACK information 718 corresponding to that DL data may be included in a part of the UL FDD subframe, as illustrated in FIG. 7. Accordingly, unlike some systems, such ACK information 718 can be transmitted without waiting for the end of that UL FDD subframe. These and various other aspects described herein may enable a relatively quicker turnaround time for communicating the ACK information 718 relative to some systems.

As described above, in some configurations, the ACK information 718 may occur near-in-time to the second DMRS 716, as illustrated in FIG. 7, instead of near-in-time to the first DMRS 714. By providing the ACK information 718 near-in-time to the second DMRS 716, instead of near-in-time to the first DMRS 714, there exists a greater likelihood that the corresponding transmission of DL data will be complete (e.g., received, decoded, demodulated, processed, etc.) prior to the time in the UL FDD subframe at which the ACK information 718 is communicated. Accordingly, the aforementioned quicker turnaround time for communicating the ACK information 718 can apply to a greater proportion of DL data transmissions.

In the example illustrated in FIG. 7, the ACK information 718 is provided subsequent to the second DMRS 716, instead of prior to the second DMRS 716. One of ordinary skill in the art will understand that both of these configurations are within the scope of the present disclosure. Nevertheless, in some configurations, providing the ACK information 718 subsequent to the second DMRS 716, instead of prior to the second DMRS, may allow even more time for complete transmission of the DL data (e.g., receipt, decoding, demodulation, processing, etc.) than might otherwise be allowed if the ACK information 718 was provided prior to the second DMRS 716.

The timing of the CQI information 712 may be relatively more flexible than the timing of the ACK information 718. Accordingly, in some configurations, the CQI information 712 may occur prior to the first DMRS 714, as illustrated in FIG. 7. One of ordinary skill in the art will understand that the CQI information 712 may additionally or alternatively be provided in various other portions of the UL FDD subframe without necessarily deviating from the scope of the present disclosure.

In the example illustrated in FIG. 7, the SRS 702 occupies the first symbol of the UL FDD subframe. In comparison, referring to FIG. 5, some configurations have the SRS 514 as the last symbol of the UL FDD subframe. Because the ACK information 706, 710 illustrated in FIG. 7 (i) occupies less of the UL FDD subframe relative to configurations and (ii) may occupy a later time portion of the UL FDD subframe relative to configurations, the SRS 702 occupying the first symbol may avoid ACK link budget reduction and provide more time for a scheduler. After the SRS 702 in the first symbol of the FDD subframe, the UL FDD subframe may include additional control information that is multiplexed with data in a frequency range that is different from the frequency range of the CQI/SR information 704, 708 and ACK information 706, 710. In this other frequency band, CQI information 712 may be included near a first DMRS 714, and ACK information 718 may be included near a second DMRS 716. More specifically, in some examples, when data and control information are multiplexed together, the CQI information is included prior to the first DMRS 714, and the ACK information 718 is included subsequent to the second DMRS 716.

Figure 8:
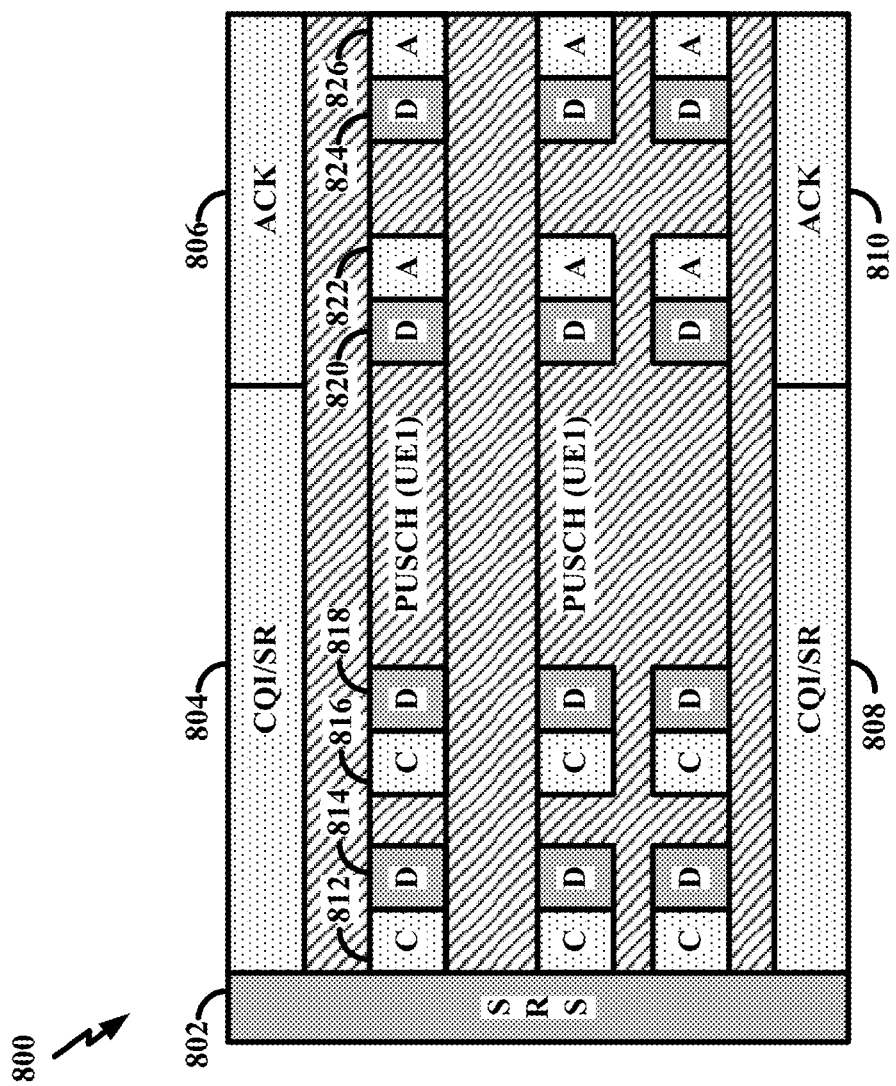
FIG. 8 is a diagram illustrating yet another example of an UL FDD subframe according to aspects of the present disclosure.

FIG. 8 is a diagram 800 illustrating yet another example of an UL FDD subframe according to aspects of the present disclosure. In some configurations, the example illustrated in FIG. 8 may be referred to as an OFDM design without deviating from the scope of the present disclosure. In the example illustrated in FIG. 8, the SRS 802 is the first symbol of the UL FDD subframe, as described in greater detail above with reference to FIG. 7. Also in the example illustrated in FIG. 8, the control information includes CQI/SR information 804, 808 that is time-multiplexed with ACK information 806, 810, as also described in greater detail above with reference to FIG. 7. Various aspects of the example illustrated in FIG. 8 is described above with reference to the examples illustrated in FIGS. 6-7 and therefore will not be repeated to avoid redundancy. The example illustrated in FIG. 8 additionally includes a number (e.g., four) of DMRSs 814, 818, 820, 824 in each of a plurality of frequency bands of the UL FDD subframe. One of ordinary skill in the art will understand that the exact number of DMRSs may vary based on implementation and design parameters without deviating from the scope of the present disclosure. In some examples, CQI information 812, 816 may be included near (e.g., prior to) some of the DMRSs 814, 818. In some examples, ACK information 822, 826 may be included near (e.g., subsequent to) some of the other DMRSs 820, 824.

Figure 9:
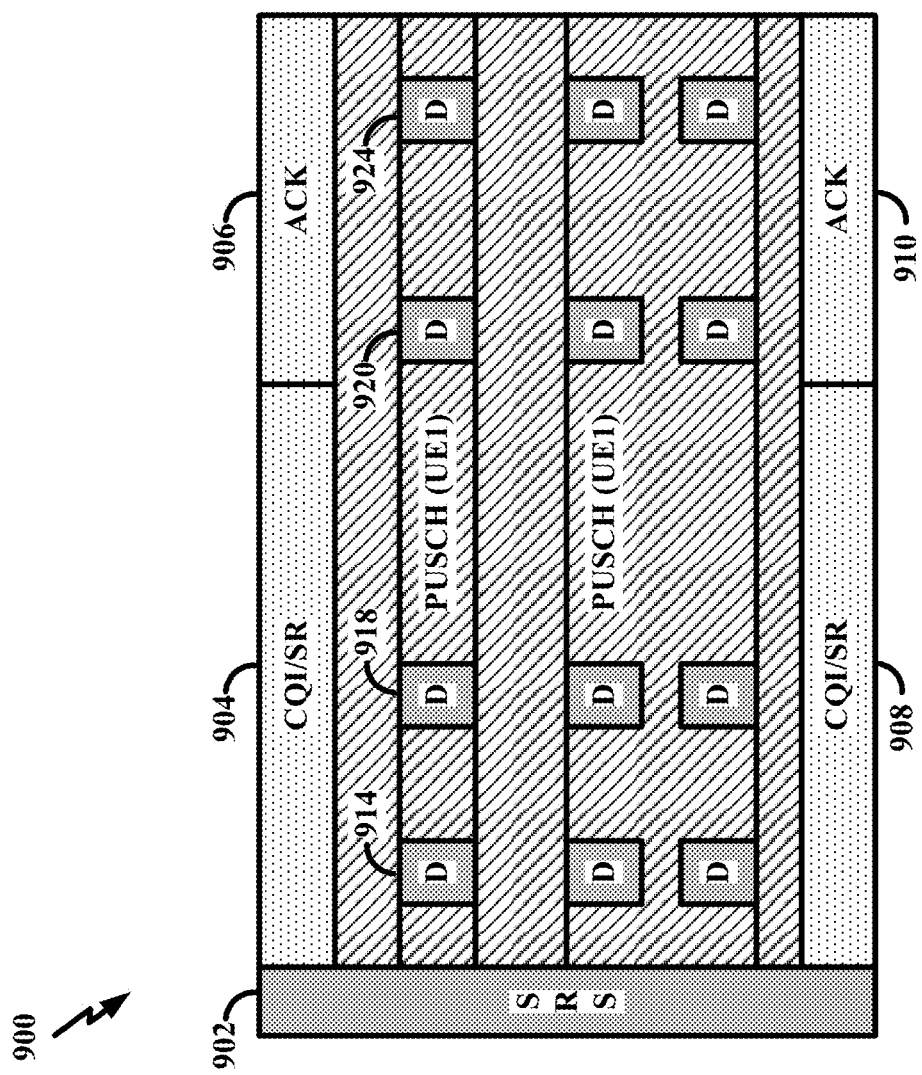
FIG. 9 is a diagram illustrating a further example of an UL FDD subframe according to aspects of the present disclosure.

FIG. 9 is a diagram 900 illustrating a further example of an UL FDD subframe according to aspects of the present disclosure. In some configurations, the example illustrated in FIG. 9 may also be referred to as an OFDM design without deviating from the scope of the present disclosure. In the example illustrated in FIG. 9, the SRS 902 is the first symbol of the UL FDD subframe, as described in greater detail above with reference to FIGS. 7-8. Also in the example illustrated in FIG. 9, the control information includes CQI/SR information 904, 908 that is time-multiplexed with ACK information 906, 910, as also described in greater detail above with reference to FIGS. 7-8. Various aspects of the example illustrated in FIG. 8 is described above with reference to the examples illustrated in FIGS. 6-8 and therefore will not be repeated to avoid redundancy. Although the example illustrated in FIG. 8 includes CQI information 812, 816 near some DMRSs 814, 818 as well as some ACK information 822, 826 near some other DMRSs 820, 824, the example illustrated in FIG. 9 does not include CQI information nor ACK information near the DMRSs 914, 918, 920, 924. In some example, multiplexing may involve power-sharing some of the resource blocks (RBs) of the UL FDD subframe.

Aspects of the present disclosure may enable the CQI information to carry more data than may be carried in configurations of CQI information. For example, in configurations described herein with reference to FIG. 5, the CQI information may carry approximately 20 bits. In comparison, the CQI information described according to aspects described herein with reference to FIGS. 6-13 may carry at least 100 bits. Various approaches may be implemented to enable such aspects of the present disclosure. As a first example, the PUCCH may be scheduled. For instance, PUCCH resources may be explicitly scheduled and/or dedicated for carrying the CQI information. As a second example, in-band control may be implemented. For instance, an L1 header may be added to the PUSCH that carries control information (which may include the CQI information, as described in greater detail above). The example involving in-band control may involve a certain level of PUSCH latency tolerance. One of ordinary skill in the art will understand that the term 'CQI' (as used herein) may include or be interchangeable with various other suitable terms or parameters without deviating from the scope of the present disclosure. For example, 'CQI' may refer to and/or be interchangeable with channel state information (CSI). CSI may include some aspects of CQI. CSI may also include aspects of other parameters, as may be known to one of ordinary skill in the art.

Figure 10:
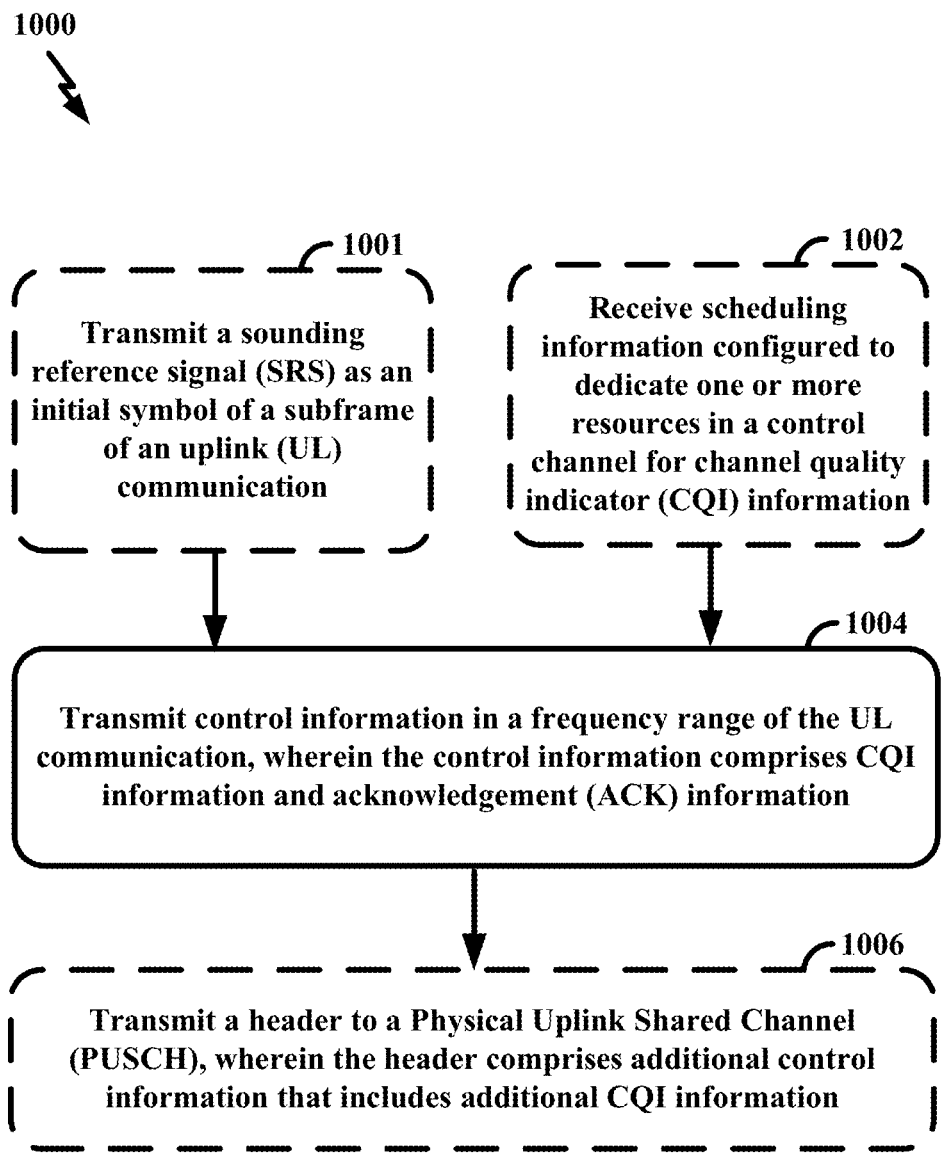
FIG. 10 is a diagram illustrating an example of various methods and/or processes performed by a subordinate entity according to aspects of the present disclosure.

FIG. 10 is a diagram 1000 illustrating an example of various methods and/or processes performed by a subordinate entity 104 according to aspects of the present disclosure. One of ordinary skill in the art will understand that such methods and/or processes may be performed by any other suitable apparatus without deviating from the scope of the present disclosure. In some configurations, at block 1001, the subordinate entity 104 may transmit an SRS as an initial symbol of a subframe of an UL communication. For example, referring to FIGS. 7-9, the SRS 702, 802, 902 is the first symbol in the UL FDD subframe. In some configurations, at block 1002, the subordinate entity 104 may receive scheduling information configured to dedicate one or more resources in a control channel (e.g., a PUCCH) for CQI information.

At block 1004, the subordinate entity 104 may transmit control information in a frequency range of the UL communication. The control information comprises CQI information and ACK information. The features pertaining to block 1004 may be implemented in various configurations without deviating from the scope of the present disclosure.

In some configurations, the CQI information is time-division multiplexed in a common frequency range as the ACK information. For example, referring to FIGS. 7-9, the UL FDD subframe includes at least one frequency range in which control information includes CQI/SR information 704, 708, 804, 808, 904, 908 time-multiplexed with ACK information 706, 710, 806, 810, 906, 910.

One of ordinary skill in the art will appreciate that CQI information and/or ACK information is/are relatively more power-sensitive than data. According to some aspects of the present disclosure, time-division multiplexing may obviate power-sharing between the CQI information and the ACK information. Put another way, because the CQI information and ACK information are time-division multiplexed, the communication of the CQI information may not need to share power with the communication of the ACK information. Although power-sharing may apply (i) between CQI information and some data and/or (ii) between ACK information and some other data, data is relatively less power-sensitive than ACK information and/or CQI information. In comparison, if the ACK information and the CQI information were frequency-division multiplexed, instead of time-division multiplexed, the communication of the ACK information and the communication of the CQI information may involve power-sharing.

In some configurations, the CQI information is transmitted prior to a first DMRS. For example, referring to FIG. 7, the UL FDD subframe includes CQI information 712 prior to the first DMRS 714. In such configurations, the ACK information is transmitted subsequent to a second DMRS. The second DMRS is subsequent to the first DMRS. For example, referring to FIG. 7, the UL FDD subframe may include ACK information 718 subsequent to the second DMRS 716.

In some configurations, the CQI information is transmitted in two or more separate portions that are each prior to a separate DMRS. For example, referring to FIG. 8, the UL FDD subframe includes CQI information 812, 816 included prior to separate DMRSs 814, 818. In such configurations, the ACK information is transmitted in two or more separate portions that are each subsequent to another separate DMRS. For example, referring to FIG. 8, the UL FDD subframe includes ACK information 822, 826 subsequent to separate DMRSs 820, 824.

In some configurations, at block 1006, the scheduling entity 102 may transmit a header to a PUSCH. The header comprises additional control information that includes additional CQI information. In some examples, the header may be an L1 header.

Figure 11:
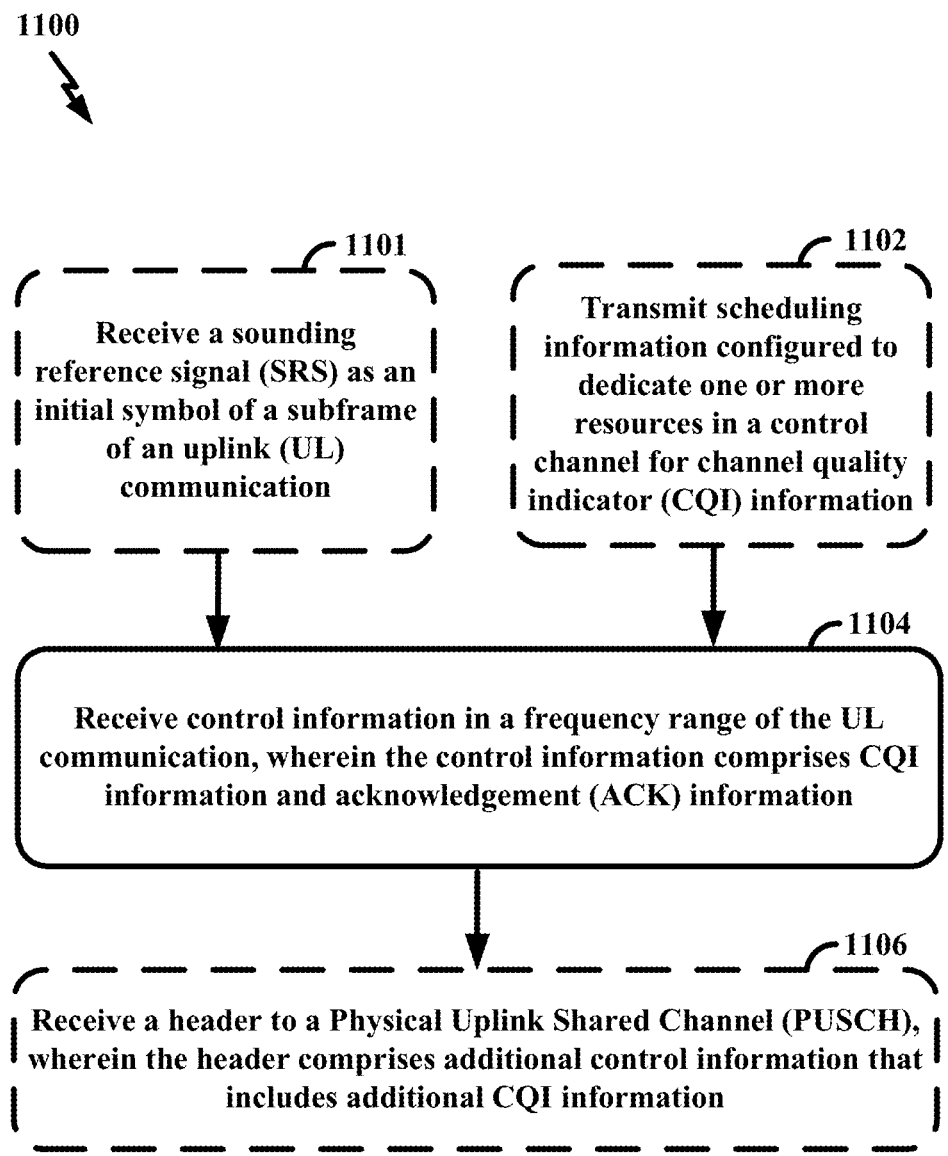
FIG. 11 is a diagram illustrating an example of various methods and/or processes performed by a scheduling entity according to aspects of the present disclosure.

FIG. 11 is a diagram 1100 illustrating an example of various methods and/or processes performed by a scheduling entity 102 according to aspects of the present disclosure. One of ordinary skill in the art will understand that such methods and/or processes may be performed by any other suitable apparatus without deviating from the scope of the present disclosure. In some configurations, at block 1101, the scheduling entity 102 may receive an SRS as an initial symbol of a subframe of an UL communication. For example, referring to FIGS. 7-9, the SRS 702, 802, 902 is the first symbol in the UL FDD subframe. In some configurations, at block 1102, the scheduling entity 102 may receive scheduling information configured to dedicate one or more resources in a control channel (e.g., a PUCCH) for CQI information.

At block 1104, the scheduling entity 102 may receive control information in a frequency range of the UL communication. The control information comprises CQI information and ACK information. The features pertaining to block 1104 may be implemented in various configurations without deviating from the scope of the present disclosure.

In some configurations, the CQI information is time-division multiplexed in a common frequency range as the ACK information. For example, referring to FIGS. 7-9, the UL FDD subframe includes at least one frequency range in which control information includes CQI/SR information 704, 708, 804, 808, 904, 908 time-multiplexed with ACK information 706, 710, 806, 810, 906, 910.

In some configurations, the CQI information is received prior to a first DMRS. For example, referring to FIG. 7, the UL FDD subframe includes CQI information 712 prior to the first DMRS 714. In such configurations, the ACK information is received subsequent to a second DMRS. The second DMRS is subsequent to the first DMRS. For example, referring to FIG. 7, the UL FDD subframe may include ACK information 718 subsequent to the second DMRS 716.

In some configurations, the CQI information is received in two or more separate portions that are each prior to a separate DMRS. For example, referring to FIG. 8, the UL FDD subframe includes CQI information 812, 816 included prior to separate DMRSs 814, 818. In such configurations, the ACK information is received in two or more separate portions that are each subsequent to another separate DMRS. For example, referring to FIG. 8, the UL FDD subframe includes ACK information 822, 826 subsequent to separate DMRSs 820, 824.

In some configurations, at block 1106, the scheduling entity 102 may receive a header to a PUSCH. The header comprises additional control information that includes additional CQI information. In some examples, the header may be an L1 header.

The methods and/or processes described with reference to any one or more of FIGS. 10-11 are provided for illustrative purposes and are not intended to limit the scope of the present disclosure. The methods and/or processes described with reference to any one or more of FIGS. 10-11 may be performed in sequences different from those illustrated therein without deviating from the scope of the present disclosure. Additionally, some or all of the methods and/or processes described with reference to any one or more of FIGS. 10-11 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Additional description pertaining to the present disclosure is provided in the Appendix filed concurrently herewith. The description herein is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims. Reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. A method of wireless communication, the method comprising:
   generating a subframe comprising control information; and
   transmitting the control information in uplink (UL) communication at a frequency range different from a frequency range of downlink (DL) communication, the transmitting the control information comprising:
   transmitting channel quality indicator (CQI) information prior to a first demodulation reference signal (DMRS); and
   transmitting acknowledgement (ACK) information subsequent to a second DMRS, the second DMRS being subsequent to the first DMRS.

2. The method of claim 1, further comprising:
   time-division multiplexing the CQI information in a common frequency range as the ACK information.

3. The method of claim 1, further comprising:
   transmitting a first amount of the CQI information in two or more separate portions that are each prior to a separate DMRS; and
   transmitting a first amount of the ACK information after the CQI information and in two or more separate portions that are each subsequent to another separate DMRS.

4. The method of claim 1, further comprising:
   receiving scheduling information configured to dedicate one or more resources in a control channel for the CQI information.

5. The method of claim 1, further comprising:
   transmitting a header to a Physical Uplink Shared Channel (PUSCH), wherein the header comprises additional control information that includes additional CQI information.

6. The method of claim 1, further comprising:
   transmitting a sounding reference signal (SRS) as an initial symbol of a subframe of the UL communication.

7. An apparatus configured for wireless communication, the apparatus comprising:
   a transceiver;
   a memory; and
   at least one processor communicatively coupled to the transceiver and the memory, wherein the at least one processor is configured to:
   generate a subframe comprising control information; and
   utilize the transceiver to transmit the control information in uplink (UL) communication at a frequency range different from a frequency range of downlink (DL) communication, the transmitting the control information comprising:
   transmitting channel quality indicator (CQI) information prior to a first demodulation reference signal (DMRS); and transmitting acknowledgement (ACK) information subsequent to a second DMRS, the second DMRS being subsequent to the first DMRS.

8. The apparatus of claim 7, wherein the CQI information is time-division multiplexed in a common frequency range as the ACK information.

9. The apparatus of claim 7, wherein:
a first amount of the CQI information is transmitted in two or more separate portions that are each prior to a separate DMRS; and
a first amount of the ACK information is transmitted after the CQI information and is transmitted in two or more separate portions that are each subsequent to another separate DMRS.

10. The apparatus of claim 7, wherein the at least one processor is further configured to:
utilize the transceiver to receive scheduling information configured to dedicate one or more resources in a control channel for the CQI information.

11. The apparatus of claim 7, wherein the at least one processor is further configured to:
utilize the transceiver to transmit a header to a Physical Uplink Shared Channel (PUSCH), wherein the header comprises additional control information that includes additional CQI information.

12. The apparatus of claim 7, wherein the at least one processor is further configured to:
utilize the transceiver to transmit a sounding reference signal (SRS) as an initial symbol of a subframe of the UL communication.

13. A non-transitory computer-readable medium storing computer-executable code comprising instructions configured to:
generate a subframe comprising control information; and
transmit the control information in uplink (UL) communication at a frequency range different from a frequency range of downlink (DL) communication, the transmitting the control information comprising:
transmitting channel quality indicator (CQI) information prior to a first demodulation reference signal (DMRS); and
transmitting acknowledgement (ACK) information subsequent to a second DMRS, the second DMRS being subsequent to the first DMRS.

14. The non-transitory computer-readable medium of claim 13, wherein the CQI information is time-division multiplexed in a common frequency range as the ACK information.

15. The non-transitory computer-readable medium of claim 13, wherein:
a first amount of the CQI information is transmitted in two or more separate portions that are each prior to a separate DMRS; and
a first amount of the ACK information is transmitted after the CQI information and is transmitted in two or more separate portions that are each subsequent to another separate DMRS.

16. The non-transitory computer-readable medium of claim 13, wherein the instructions are further configured to:
receive scheduling information configured to dedicate one or more resources in a control channel for the CQI information.

17. The non-transitory computer-readable medium of claim 13, wherein the instructions are further configured to:
transmit a header to a Physical Uplink Shared Channel (PUSCH), wherein the header comprises additional control information that includes additional CQI information.

18. The non-transitory computer-readable medium of claim 13, wherein the instructions are further configured to:
transmit a sounding reference signal (SRS) as an initial symbol of a subframe of the UL communication.

19. A method of wireless communication, the method comprising:
receiving control information in uplink (UL) communication at a frequency range different from a frequency range of downlink (DL) communication, the receiving the control information comprising:
receiving channel quality indicator (CQI) information prior to a first demodulation reference signal (DMRS);
receiving acknowledgement (ACK) information subsequent to a second DMRS, the second DMRS being subsequent to the first DMRS; and
processing a subframe comprising the received control information.

20. The method of claim 19, wherein the CQI information is time-division multiplexed in a common frequency range as the ACK information.

21. The method of claim 19, further comprising:
receiving a first amount of the CQI information in two or more separate portions that are each prior to a separate DMRS; and
receiving a first amount of the ACK information after the CQI information and in two or more separate portions that are each subsequent to another separate DMRS.

22. The method of claim 19, further comprising:
transmitting scheduling information configured to dedicate one or more resources in a control channel for the CQI information.

23. The method of claim 19, further comprising:
receiving a header to a Physical Uplink Shared Channel (PUSCH), wherein the header comprises additional control information that includes additional CQI information.

24. The method of claim 19, further comprising:
receiving a sounding reference signal (SRS) as an initial symbol of a subframe of the UL communication.

25. An apparatus configured for wireless communication, the apparatus comprising:
a transceiver;
a memory; and
at least one processor communicatively coupled to the transceiver and the memory, wherein the at least one processor is configured to:
utilize the transceiver to receive control information in uplink (UL) communication at a frequency range different from a frequency range of downlink (DL) communication, the receiving the control information comprising:
receiving channel quality indicator (CQI) information prior to a first demodulation reference signal (DMRS); and
receiving acknowledgement (ACK) information subsequent to a second DMRS, the second DMRS being subsequent to the first DMRS; and
process a subframe comprising the received control information.

26. The apparatus of claim 25, wherein the CQI information is time-division multiplexed in a common frequency range as the ACK information.

27. The apparatus of claim 25, wherein:
a first amount of the CQI information is received in two or more separate portions that are each prior to a separate DMRS; and
a first amount of the ACK information is received after the CQI information and is received in two or more separate portions that are each subsequent to another separate DMRS.

28. The apparatus of claim 25, wherein the at least one processor is further configured to:
utilize the transceiver to transmit scheduling information configured to dedicate one or more resources in a control channel for the CQI information.

29. The apparatus of claim 25, wherein the at least one processor is further configured to:
utilize the transceiver to receive a header to a Physical Uplink Shared Channel (PUSCH), wherein the header comprises additional control information that includes additional CQI information.

30. The apparatus of claim 25, wherein the at least one processor is further configured to:
utilize the transceiver to receive a sounding reference signal (SRS) as an initial symbol of a subframe of the UL communication.

31. A non-transitory computer-readable medium storing computer-executable code comprising instructions configured to:
receive control information in uplink (UL) communication at a frequency range different from a frequency range of downlink (DL) communication, the receiving the control information comprising:
receiving channel quality indicator (CQI) information prior to a first demodulation reference signal (DMRS);
receiving acknowledgement (ACK) information subsequent to a second DMRS, the second DMRS being subsequent to the first DMRS; and
process a subframe comprising the received control information.

32. The non-transitory computer-readable medium of claim 31, wherein the CQI information is time-division multiplexed in a common frequency range as the ACK information.

33. The non-transitory computer-readable medium of claim 31, wherein:
an amount of the CQI information is received in two or more separate portions that are each prior to a separate DMRS; and
an amount of the ACK information is received after the CQI information and is received in two or more separate portions that are each subsequent to another separate DMRS.

34. The non-transitory computer-readable medium of claim 31, wherein the instructions are further configured to:
transmit scheduling information configured to dedicate one or more resources in a control channel for the CQI information.

35. The non-transitory computer-readable medium of claim 31, wherein the instructions are further configured to:
receive a header to a Physical Uplink Shared Channel (PUSCH), wherein the header comprises additional control information that includes additional CQI information.

36. The non-transitory computer-readable medium of claim 31, wherein the instructions are further configured to:
receive a sounding reference signal (SRS) as an initial symbol of a subframe of the UL communication.

* * * * *